(12) United States Patent
Kristensson et al.

(10) Patent No.: US 12,517,639 B2
(45) Date of Patent: Jan. 6, 2026

(54) ONE-HANDED SCALED DOWN USER INTERFACE MODE

(71) Applicant: Telefonaktiebolaget LM Ericsson (publ), Stockholm (SE)

(72) Inventors: Andreas Kristensson, Södra Sandby (SE); Fredrik Dahlgren, Lund (SE); Alexander Hunt, Tygelsjö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 266 days.

(21) Appl. No.: 18/562,273

(22) PCT Filed: May 27, 2021

(86) PCT No.: PCT/EP2021/064294
§ 371 (c)(1),
(2) Date: Nov. 17, 2023

(87) PCT Pub. No.: WO2022/248055
PCT Pub. Date: Dec. 1, 2022

(65) Prior Publication Data
US 2024/0241631 A1  Jul. 18, 2024

(51) Int. Cl.
*G06F 3/04845* (2022.01)
*G06F 3/0488* (2022.01)

(52) U.S. Cl.
CPC ........ *G06F 3/04845* (2013.01); *G06F 3/0488* (2013.01); *G06F 2203/04808* (2013.01)

(58) Field of Classification Search
CPC ............... G06F 3/04845; G06F 3/0488; G06F 2203/04808; G06F 3/04842;
(Continued)

(56) References Cited

U.S. PATENT DOCUMENTS 6,088,023 A   7/2000  Louis et al.
7,903,845 B2  3/2011  Matsunaga et al.
(Continued)

FOREIGN PATENT DOCUMENTS

CN   104461232 A   3/2015
CN   106527693 A   3/2017
(Continued)

OTHER PUBLICATIONS

PCT International Search Report, mailed Feb. 24, 2022, in connection with International Application No. PCT/EP2021/064294, all pages.
(Continued)

*Primary Examiner* — Angie Badawi
(74) *Attorney, Agent, or Firm* — Weisberg I.P. Law, P.A.

(57) ABSTRACT

A user interface of a device is operated, wherein the user interface comprises a touch sensitive display device. Operation includes, while operating the device in a limited accessibility mode, detecting that an initial gesture has been received by the touch sensitive display device. When entering a fully accessible mode of operation, the user interface is operated in a scaled mode if the detected initial gesture is a first mode changing gesture, otherwise the user interface is operated in a full-size mode. When an application or system software produces an output image to be displayed on the device, operating the user interface in the full-size mode comprises displaying the output image over a first area of the touch sensitive display device; and accepting touch input of the application or system software at a set of input touch points lying within the first area of the touch sensitive display device. Operating the user interface in the scaled mode comprises scaling the output image and displaying the scaled output image over a scaled area of the touch sensitive display device, wherein the scaled area is smaller than the
(Continued)

first area; and scaling the set of input touch points such that the scaled set of input touch points lie within the scaled area of the touch sensitive display device, wherein a size of the scaled area of the touch sensitive display is related to a first set of one or more detected points within the first mode changing gesture; and a location of the scaled area of the touch sensitive display is related to a second set of one or more detected points within the first mode changing gesture.

26 Claims, 10 Drawing Sheets

(58) Field of Classification Search
CPC ....... G06F 2203/04806; G06F 3/04883; G06F 3/04886
See application file for complete search history.

(56) References Cited

U.S. PATENT DOCUMENTS

| | | | |
|---|---|---|---|
| 8,443,199 | B2 | 5/2013 | Kim et al. |
| 8,796,431 | B2 | 8/2014 | Stowell et al. |
| 9,448,587 | B2 | 9/2016 | Park |
| 10,162,520 | B2 | 12/2018 | Adams |
| 10,318,034 | B1 | 6/2019 | Hauenstein |
| 2007/0268261 | A1 | 11/2007 | Lipson |
| 2009/0219260 | A1 | 9/2009 | Bick |
| 2011/0043455 | A1 | 2/2011 | Roth et al. |
| 2011/0205169 | A1 | 8/2011 | Yasutake |
| 2012/0218200 | A1 | 8/2012 | Glazer et al. |
| 2012/0327009 | A1 | 12/2012 | Fleizach |
| 2013/0169560 | A1 | 7/2013 | Cederlund et al. |
| 2013/0176250 | A1 | 7/2013 | Lee et al. |
| 2013/0342480 | A1 | 12/2013 | Moon et al. |
| 2014/0111452 | A1 | 4/2014 | Park et al. |
| 2014/0181739 | A1 | 6/2014 | Yoo |
| 2014/0218309 | A1 | 8/2014 | Park |
| 2014/0267142 | A1 | 9/2014 | MacDougall et al. |
| 2014/0289642 | A1 | 9/2014 | Prasad |
| 2014/0362119 | A1 | 12/2014 | Freund et al. |
| 2014/0380209 | A1 | 12/2014 | Tsukamoto |
| 2015/0084885 | A1 | 3/2015 | Kawamoto |
| 2015/0128081 | A1 | 5/2015 | Hsieh |
| 2015/0138083 | A1 | 5/2015 | Takano |
| 2015/0205507 | A1 | 7/2015 | Chen |
| 2015/0242065 | A1 | 8/2015 | Ko et al. |
| 2015/0261295 | A1 | 9/2015 | Lee |
| 2015/0338914 | A1 | 11/2015 | Andrysco |
| 2016/0034140 | A1 | 2/2016 | Navsariwala |
| 2016/0162150 | A1 | 6/2016 | Patel et al. |
| 2016/0252968 | A1 | 9/2016 | Noble |
| 2016/0274761 | A1 | 9/2016 | Alonso Ruiz et al. |
| 2016/0349856 | A1* | 12/2016 | Chi ................... G06F 3/04817 |
| 2017/0031542 | A1 | 2/2017 | Ryu et al. |
| 2017/0102810 | A1 | 4/2017 | Satake |
| 2017/0277387 | A1 | 9/2017 | Yoo |
| 2018/0052518 | A1 | 2/2018 | Zhu et al. |
| 2019/0073125 | A1 | 3/2019 | Adams |
| 2019/0114021 | A1 | 4/2019 | Oliver et al. |
| 2019/0369829 | A1 | 12/2019 | Turner et al. |
| 2020/0356258 | A1 | 11/2020 | Liu |
| 2021/0311573 | A1 | 10/2021 | He |
| 2022/0291821 | A1* | 9/2022 | Chen ................. G06F 3/04847 |
| 2022/0300106 | A1 | 9/2022 | Cheng |

FOREIGN PATENT DOCUMENTS

| | | | |
|---|---|---|---|
| CN | 105824545 | B | 8/2017 |
| CN | 102830914 | B | 6/2018 |
| CN | 108733282 | A | 11/2018 |
| EP | 2863297 | A1 | 4/2015 |
| EP | 2921942 | A1 | 9/2015 |
| EP | 3540584 | A1 | 9/2019 |
| JP | 2012048359 | A | 3/2012 |
| JP | 2015109000 | A | 6/2015 |
| JP | 2015535639 | A | 12/2015 |
| JP | 201986872 | A | 6/2019 |
| KR | 10-1250821 | B1 | 4/2013 |
| KR | 10-1341737 | B1 | 12/2013 |
| KR | 20160019762 | A | 2/2016 |
| WO | 2015112405 | A1 | 7/2015 |
| WO | 2015126196 | A1 | 8/2015 |
| WO | 2015064008 | A1 | 3/2017 |
| WO | 2018057944 | A1 | 3/2018 |
| WO | 2018222111 | A1 | 12/2018 |
| WO | 2022248054 | A1 | 12/2022 |
| WO | 2022248056 | A1 | 12/2022 |
| WO | 2023078548 | A1 | 5/2023 |

OTHER PUBLICATIONS

PCT Written Opinion, mailed Feb. 24, 2022, in connection with International Application No. PCT/EP2021/064294, all pages.
YouTube, "How to shrink your android screen for one hand action", Mar. 11, 2017, https://www.youtube.com/watch?v=XTZf9QNex4l&ab_channel-HowToAndDiy, 4 pages.
Unknown, "Using One Handed Mode on my Samsung Phone", Samsung Australia, Mar. 19, 2021, https://www.samsung.com/au/support/mobile-devices/using-one-handed-mode/, 9 pages.
Lai, J. et al., "ThumbStroke: A Virtual Keyboard in Support of Sight-Free and One-Handed Text Entry on Touchscreen Mobile Devices", ACM Trans. Manage. Inf. Syst., vol. 10, No. 3, Article 11, Sep. 2019.
PCT International Search Report, mailed Mar. 3, 2022, in connection with International Application No. PCT/EP2021/064296, all pages.
PCT Written Opinion, mailed Mar. 3, 2022, in connection with International Application No. PCT/EP2021/064296, all pages.
Wikipedia, "Google ATAP", https://en.wikipedia.org/wiki/Google_ATAP, Nov. 24, 2020, pp. 1-6.
PCT International Search Report, mailed Feb. 9, 2022, in connection with International Application No. PCT/EP2021/064293, all pages.
PCT Written Opinion, mailed Feb. 9, 2022, in connection with International Application No. PCT/EP2021/064293, all pages.
Alepis, E., et al., "Human Smartphone Interaction: Exploring smartphone senses", in Proc. of The 5th International Conference on Information, Intelligence, Systems and Applications, 2014, 5 pages.
Jeliazkov, D., "Mobile Usability Made Simple", https://uxplanet.org/mobile-usability-made-simple-945e106e23eb, Feb. 28, 2019, 9 pages.
Zhuo, S., et al., "Real-time Smartphone Activity Classification Using Intertial Sensors-Recognition of Scrolling, Typing, and Watching Videos While Sitting or Walking", Sensors 2020, 20, 655, www.mdpi.com/journal/sensors, 18 pages.
Wikipedia, "Swype", https://en.wikipedia.org/w/index.php?title=Swype&oldid=1020497901, last edited Apr. 29, 2021, 7 pages.
Drewes, H., et al., "The Magic Touch: Combining Magic-Pointing with a Touch-Sensitive Mouse", in Proc. of Human-Computer Interaction—Interact 2009, PT II, vol. 5727, 14 pages.
PCT International Search Report, mailed Jul. 20, 2022, in connection with International Application No. PCT/EP2021/080563, all pages.
PCT Written Opinion, mailed Jul. 20, 2022, in connection with International Application No. PCT/EP2021/080563, all pages.
Non-Final Office Action issued May 14, 2025 in connection with U.S. Appl. No. 18/562,307, 16 pages.
Non-Final Office Action issued Sep. 16, 2024 in connection with U.S. Appl. No. 18/562,307, 31 pages.
Non-Final Office action mailed Aug. 14, 2024 in connection with U.S. Appl. No. 18/561,220, 35 pages.
Korean Office Action, with English language translation, mailed Jun. 16, 2025 in connection with Korean Application No. 10-2023-7045013, 13 pages.

(56) References Cited

OTHER PUBLICATIONS

Japanese Office Action, with English language translation, issued Jun. 24, 2025 in connection with Japanese Application No. 2024-526860, 7 pages.

* cited by examiner

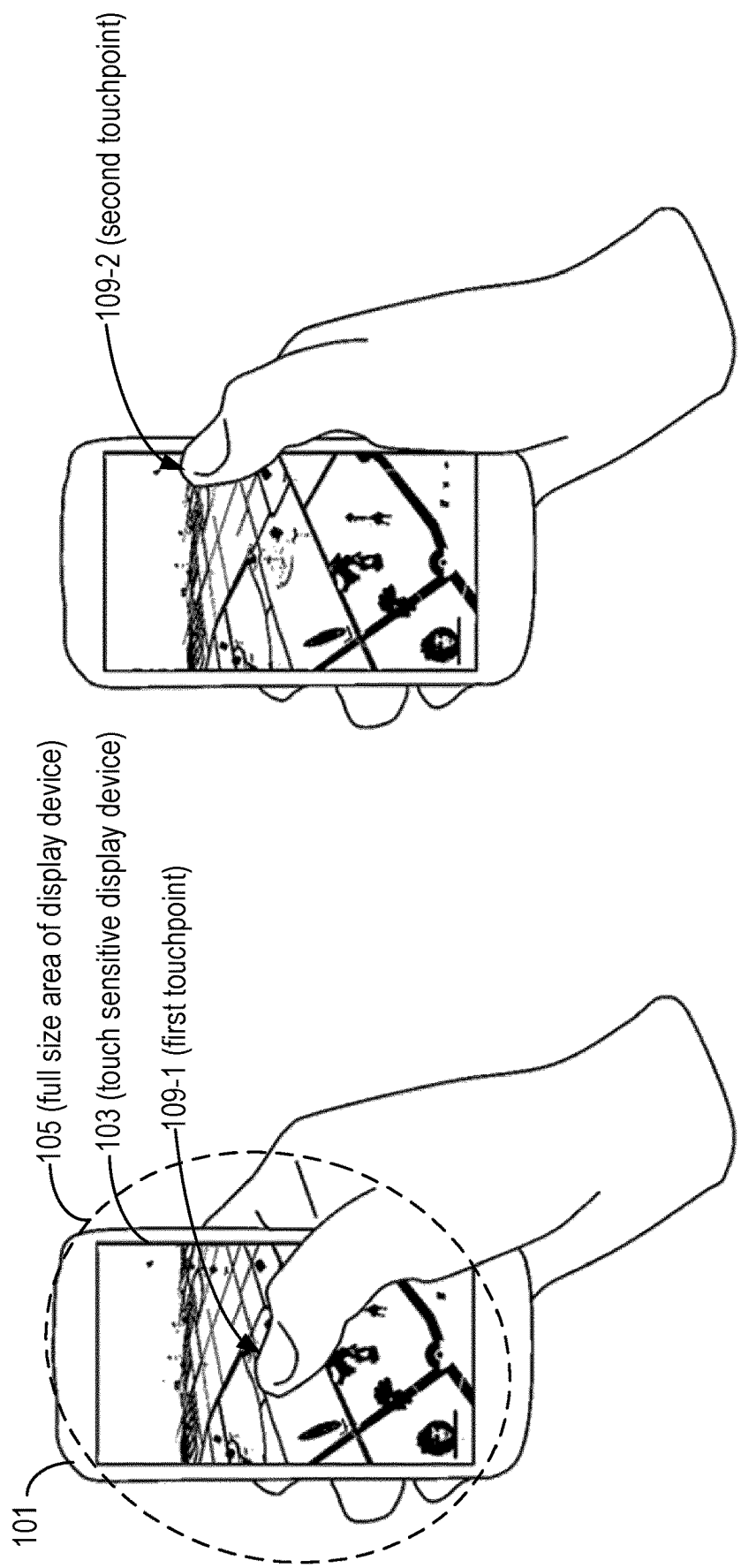

107 (scaled area of touchscreen defined by gesture)

ONE-HANDED SCALED DOWN USER INTERFACE MODE

BACKGROUND

The present invention relates to technology that enables a user to operate a handheld device having a touchscreen display, and more particularly to technology that enables a user to use one hand to simultaneously hold the device and have full access to a scaled down interface presented via the touchscreen display.

Today's smartphones have touchscreens that not only display information to a user, but also enable the user to supply input to the device, such as selections and data. The user interacts with touchscreens primarily by touching the display with one or more fingers. However in the general case, touch interaction can have many types of gestural inputs (micro-interactions) such as tap, double-tap, slide, tap-slide, tap-hold, swipe, flip, pinch, and the like.

Inputting information in this way is very simple and accurate when the user holds the device with one hand while interacting with the touchscreen with the other. Quite often, however, the user is holding the device with one hand while the other hand is busy doing other things, for example, carrying a bag or similar. Relatively long ago, when phones were small and had physical buttons only on parts of the front surface, it was relatively easy for most people to use just one hand to both operate the phone and hold it (i.e., one-handed operation). However, with today's large phones, this is very difficult with the touch-based User Interface (UI) and it is consequently quite common that people drop the phone while trying to do so.

To address this problem, some current devices are equipped with technology that enables a user to engage in one handed operation by temporarily scaling down the display size of the screen for easier control of the phone with just one hand. The scaled down display can be moved around on the screen by touching on the scaled down display window bar and moving the window. The scaled down display can be made smaller or bigger by dragging one of the corners of the scaled down display window.

Other solutions are also known. For example, J. Lai et al., "ThumbStroke: A Virtual Keyboard in Support of Sight-Free and One-Handed Text Entry on Touchscreen Mobile Devices", ACM Trans. Manage. Inf. Syst., Vol. 10, No. 3, Article 11, published September 2019 describes a virtual keyboard that allows for one handed text entry on mobile devices. One possible way to initiate the keyboard is by using a hot corner on the device.

U.S. Patent Publication No. 201900731258, published Mar. 7, 2019 describes another solution in which a keyboard adapts to hand and thumb characteristics.

There are still problems with current solutions, however. For example, these approaches require a number of steps to initiate one handed mode in order to define the size of the scaled down display and to define the placement of the scaled down display window on the screen. Also, due to the many steps of initiating the thumb mode, the solutions do not support landscape mode.

And still further, current technology does not provide an efficient way to initiate one handed operation when a device is first accessed while in a mode having limited accessibility (e.g., sleep or locked mode).

There is therefore a need for technology that addresses the above and/or related problems.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

Moreover, reference letters may be provided in some instances (e.g., in the claims and summary) to facilitate identification of various steps and/or elements. However, the use of reference letters is not intended to impute or suggest that the so-referenced steps and/or elements are to be performed or operated in any particular order.

In accordance with one aspect of the present invention, the foregoing and other objects are achieved in technology (e.g., methods, apparatuses, nontransitory computer readable storage media, program means) that enable operation of a user interface of a device, wherein the user interface comprises a touch sensitive display device. The operation in accordance with the technology comprises, while operating the device in a limited accessibility mode, detecting that an initial gesture has been received by the touch sensitive display device. When entering a fully accessible mode of operation, the user interface is operated in a scaled mode if the detected initial gesture is a first mode changing gesture, otherwise the user interface is operated in a full-size mode. Further, when an application or system software produces an output image to be displayed on the device, operating the user interface in the full-size mode comprises displaying the output image over a first area of the touch sensitive display device; and accepting touch input of the application or system software at a set of input touch points lying within the first area of the touch sensitive display device. Operating the user interface in the scaled mode comprises scaling the output image and displaying the scaled output image over a scaled area of the touch sensitive display device, wherein the scaled area is smaller than the first area; and scaling the set of input touch points such that the scaled set of input touch points lie within the scaled area of the touch sensitive display device, wherein a size of the scaled area of the touch sensitive display is related to a first set of one or more detected points within the first mode changing gesture; and a location of the scaled area of the touch sensitive display is related to a second set of one or more detected points within the first mode changing gesture.

In another aspect of some but not necessarily all embodiments consistent with the invention, operation comprises recording the detected initial gesture as a recorded gesture; and evaluating the recorded gesture to decide whether detected initial gesture is the first mode changing gesture.

In yet another aspect of some but not necessarily all embodiments consistent with the invention, operation comprises while operating the device in the fully accessible mode, detecting that the first mode changing gesture has been received by the touch sensitive display device and in response thereto, operating the user interface in the scaled mode.

In still another aspect of some but not necessarily all embodiments consistent with the invention, operation comprises while operating the device in the fully accessible mode, detecting that a second mode changing gesture has been received by the touch sensitive display device and in response thereto, operating the user interface in the full-size mode. In some of these embodiments, the second mode changing gesture comprises received touch point data that represents two fingers concurrently touching respective first and second touchpoints within a central region of the touch sensitive display device and then concurrently moving to opposite sides of the touch sensitive display device. In some but not necessarily all alternative embodiments, the second mode changing gesture comprises received touch point data that represents a touch of the touch sensitive display device by a digit other than a thumb.

In another aspect of some but not necessarily all embodiments consistent with the invention, the first mode changing gesture comprises touch sensitive display device input data comprising a first touchpoint; a second touchpoint indicating a first corner of a region of the touch sensitive display device; a third touchpoint indicating a second corner of the region of the touch sensitive display device; and a fourth touchpoint indicating a third corner of the region of the touch sensitive display device, wherein the method further comprises configuring the scaled area of the touch sensitive display device to fit entirely within the region of the touch sensitive display device. In some but not necessarily all such embodiments, the second touchpoint is located at a horizontal border of the touch sensitive display device. In some but not necessarily all alternative embodiments, the fourth touchpoint is located at a vertical border of the touch sensitive display device.

In yet another aspect of some but not necessarily all embodiments consistent with the invention, the first mode changing gesture comprises touch sensitive display device input data comprising a first touchpoint indicating a first horizontal extent and a first vertical extent of the scaled area of the touch sensitive display device; and a second touchpoint indicating a second horizontal extent and a second vertical extent of the scaled area of the touch sensitive display device.

In still another aspect of some but not necessarily all embodiments consistent with the invention, the first mode changing gesture comprises touch sensitive display device input data comprising a first touchpoint indicating a first horizontal extent and a first vertical extent of a region of the touch sensitive display device; a second touchpoint indicating a second horizontal extent and a second vertical extent of the region of the touch sensitive display device; and a plurality of touchpoints collected between receipt of the first touchpoint and receipt of the second touchpoint; and operation of the device further comprises configuring the scaled area of the touch sensitive display device to fit entirely within the region of the touch sensitive display device. In some but not necessarily all of such embodiments, a shape defined by the first mode changing gesture is an arc. In some but not necessarily all alternatives, configuring the scaled area of the touch sensitive display device to fit entirely within the region of the touch sensitive display device comprises configuring the scaled area of the touch sensitive display device to be a largest scaled rectangular area that fits entirely within the region of the touch sensitive display device.

In another aspect of some but not necessarily all embodiments consistent with the invention, the first mode changing gesture comprises one or more final taps that indicate where a center point of the scaled area of the touch sensitive display device is to be located.

In yet another aspect of some but not necessarily all embodiments consistent with the invention, when operating the device in a transition mode that is configured to transition from the limited accessibility mode to the fully accessible mode of operation, operation of the device comprises operating the user interface in the scaled mode if the detected initial gesture is the first mode changing gesture, and otherwise operating the user interface in the full-size mode.

BRIEF DESCRIPTION OF THE DRAWINGS

The objects and advantages of the invention will be understood by reading the following detailed description in conjunction with the drawings in which:

FIGS. 1A, 1B, 1C, 1D, and 1E depict a device having a touch sensitive display device 103 that is initially operating in a full-size mode and that transitions into a scaled mode of operation 107 as a result of a user applying a gesture to the touch sensitive display device.

DETAILED DESCRIPTION

Figure 1D:
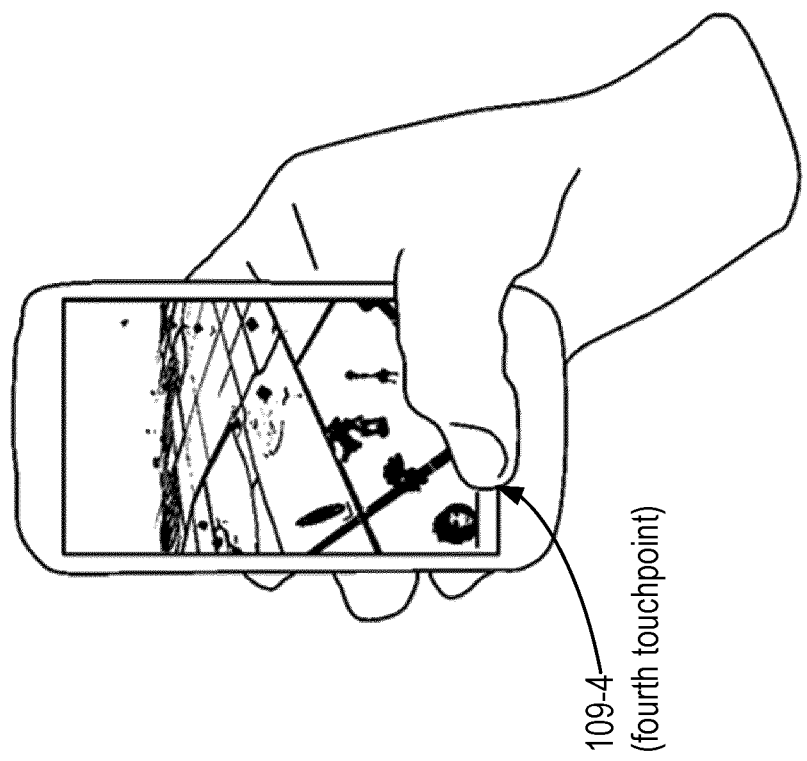

The various features of the invention will now be described in connection with a number of exemplary embodiments with reference to the figures, in which like parts are identified with the same reference characters.

To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits alone, one or more programmed processors, or any combination of these). Moreover, the invention can additionally be considered to be embodied entirely within any form of non-transitory computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

In one aspect of embodiments consistent with the invention, the technology involves a user device's touch sensitive display device receiving a gesture that both initiates one-handed mode of operation, and defines the size and location of a scaled down display and entry area within the touch sensitive display device.

In another aspect of embodiments consistent with the invention, the gesture is operative not only when the device is operating in a fully accessible mode (e.g., when the device is in an unlocked state) but also when the device is operating in a limited accessibility mode (e.g., when the user's ability to access device functionality is limited, regardless of user interface mode, because the device is in a low-power mode and/or locked state).

These and other aspects are described in the following.

FIGS. 1A, 1B, 1C, 1D, and 1E depict a device 101 having a touch sensitive display device 103 that is initially operating in a full-size mode 105 and that transitions into a scaled mode of operation 107 as a result of a user applying a gesture to the touch sensitive display device. In this nonlimiting example, the gesture comprises respective first, second, third, and fourth touchpoints 109-1, 109-2, 109-3, and 109-4. As all points within the gesture were reachable by the user's thumb while holding the device with one hand, all points within the resulting scaled area of the touchscreen 107 are also reachable to make for easy one-handed operation of the device 101.

Looking at the transition from full-size mode (in which the user interacts with the device 101 via the full size area 105 of the display device 103) to the scaled mode of operation (in which the user interacts with the device 101 via a scaled area 107 of the display device 103) in more detail, in FIG. 1A a user is shown holding the mobile device with one hand and touching with the thumb on the screen at a first touchpoint 109-1. The device 101 is shown operating in the full-size mode in which the entirety of the device's touch sensitive display device 103 (full size area 105 of the touch sensitive display device) is used.

As shown in FIG. 1B, the user has moved their thumb to the right and touches a second touchpoint 109-2 at the right edge of the screen and/or device edge. This defines the starting point of the gesture and also identifies a first corner of a region of the touch sensitive display device in which the scaled down display window will be placed.

Figure 1C:
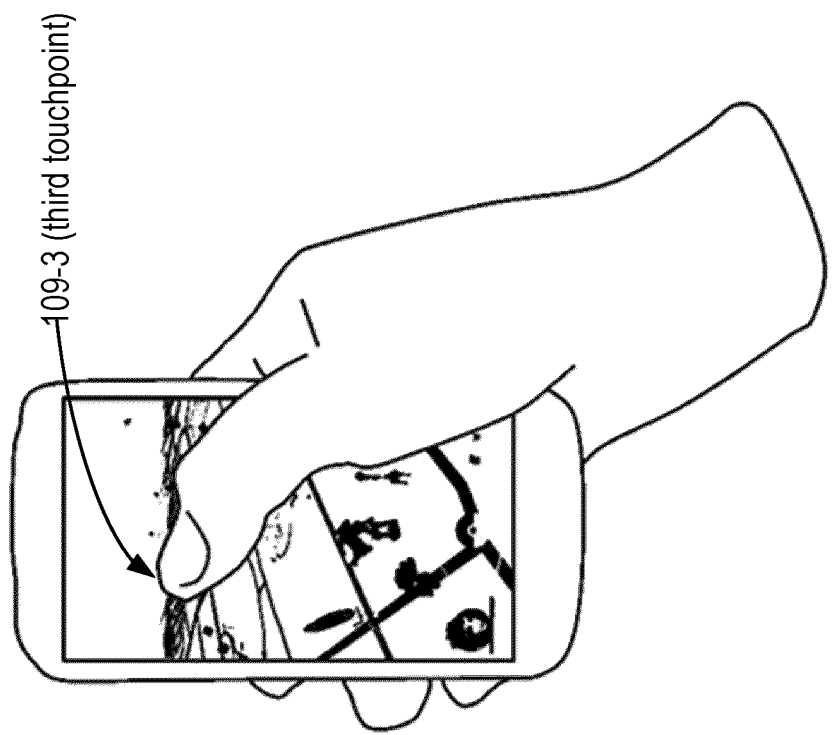

Next, as shown in FIG. 1C, the user continues to touch the screen as the thumb is moved inwards on the screen until the thumb comes to rest at a third touchpoint 109-3. This defines a second corner of the region of the touch sensitive display device in which the scaled down display window will be placed.

Next, as shown in FIG. 1D, the user continues to touch the screen as the thumb is moved downwards on the screen until the thumb comes to rest at a fourth touchpoint 109-4. This defines a third corner of the region of the touch sensitive display device in which the scaled down display window will be placed. Note that there is no requirement that the fourth touchpoint 109-4 be at the bottom edge of the screen. Instead, the user may stop the thumb anywhere on the screen on its way downwards, and that stopping point will be taken as the fourth touchpoint 109-4.

Figure 1E:
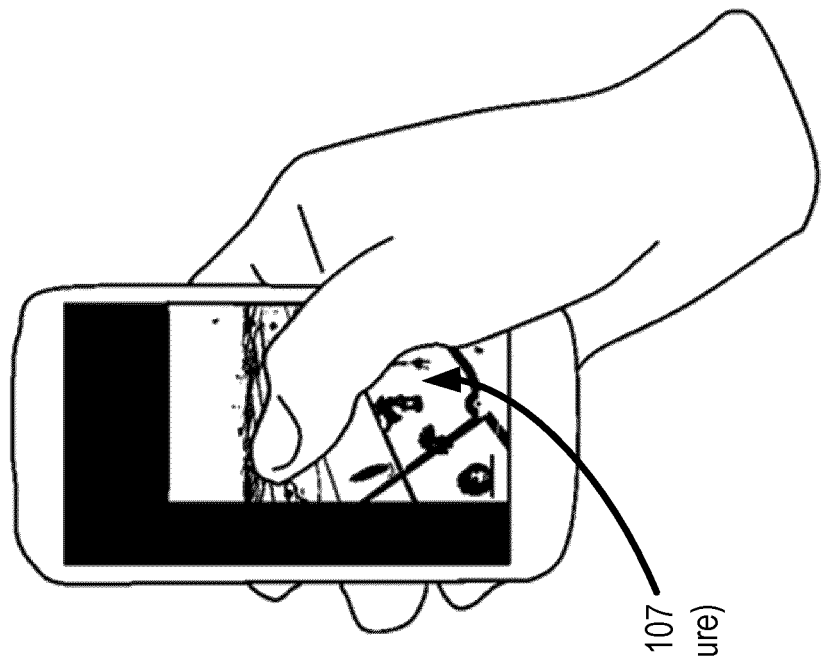

In an aspect of embodiments consistent with the invention, as shown in FIG. 1E, the system deduces from the supplied gesture that it is a mode changing gesture, and in response scales down the display to a scaled area 107 of the touchscreen with a placement and size having corners that fit within the region of the touch sensitive display device defined by the first, second, third, and fourth touchpoints 109-1, 109-2, 109-3, 109-4.

Figure 1F:
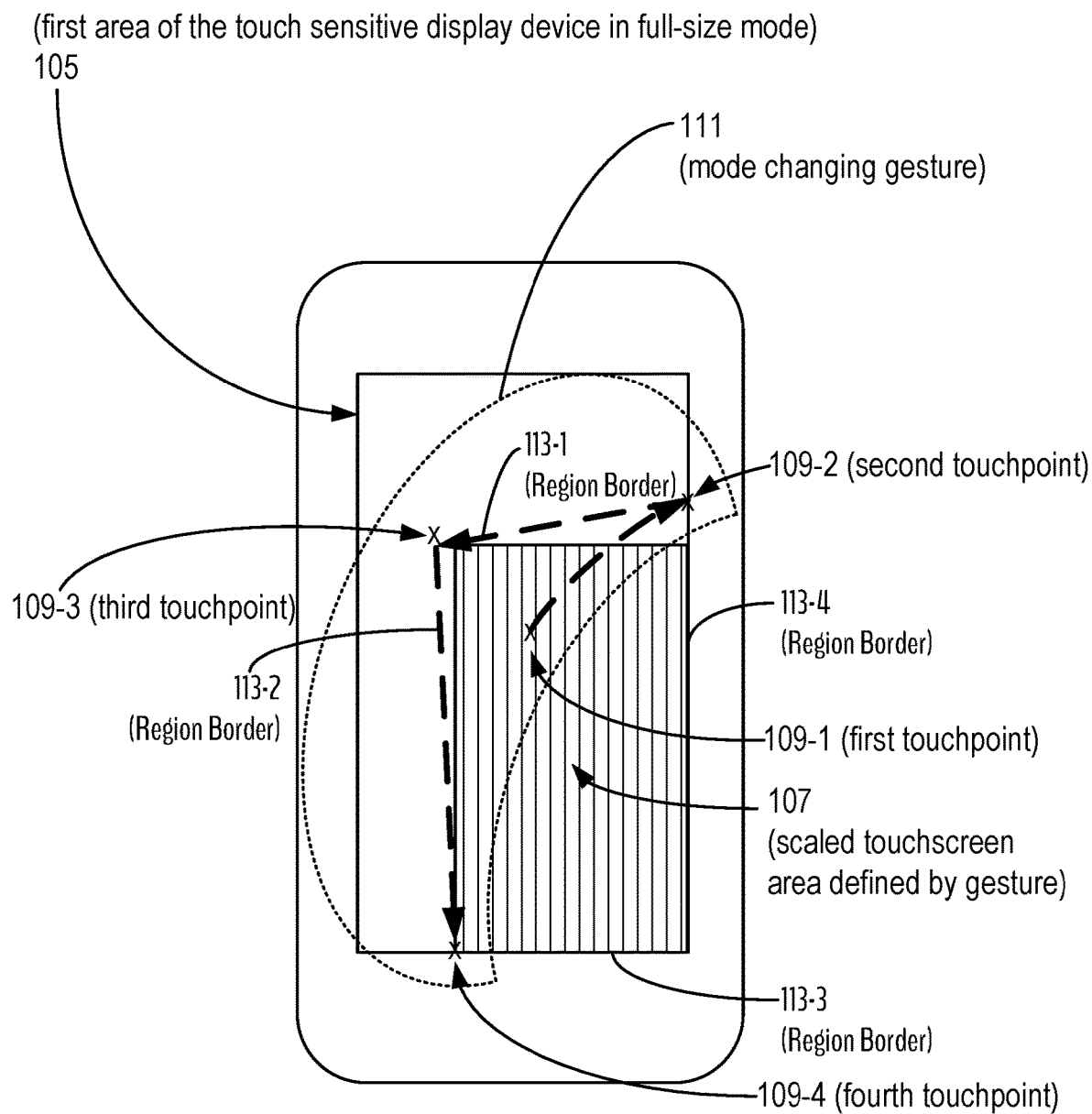
FIG. 1F is a diagram focusing on an exemplary mode changing gesture in accordance with an aspect of inventive embodiments.

FIG. 1F depicts the above-described operation with a focus on the mode changing gesture 111, which can also be called a scaled input activation gesture. Within a first area of the touch sensitive display device 105 that is operational within the full-size mode, the user initially touches a first touchpoint 109-1, then sweeps the thumb (or other finger or similar object) towards the right to a second touchpoint 109-2, then towards the left to a third touchpoint 109-3, and then downwards to a final, fourth touchpoint 109-4. As mentioned above, the second, third, and fourth touchpoints 109-2, 109-3, 109-4 define corners of a region of the touch sensitive display device within which the scaled touchscreen area 107 fits. In this non-limiting exemplary embodiment, the region is bounded by region borders 113-1, 113-2 (which are defined by the second, third, and fourth touchpoints 109-2, 109-3, 109-4) and by region borders 113-3, 113-4 (which are defined by the lower and right sides of the touch sensitive display device 103).

It will be noted that the above is a non-limiting example and that the gesture can be configured in other ways. For example, left-handed operation can be facilitated by defining the mode changing gesture 111 to include a sweeping of the thumb to the left instead of to the right, to arrive at the second touchpoint 109-2.

And in another aspect, the illustrated example shows operation when the device is oriented in portrait mode. However, the system can be configured to recognize the mode changing gesture 111 when received with the device 101 oriented in landscape mode, and the scaled touchscreen area 107 will accordingly be defined and oriented in landscape mode as well.

Figure 2:
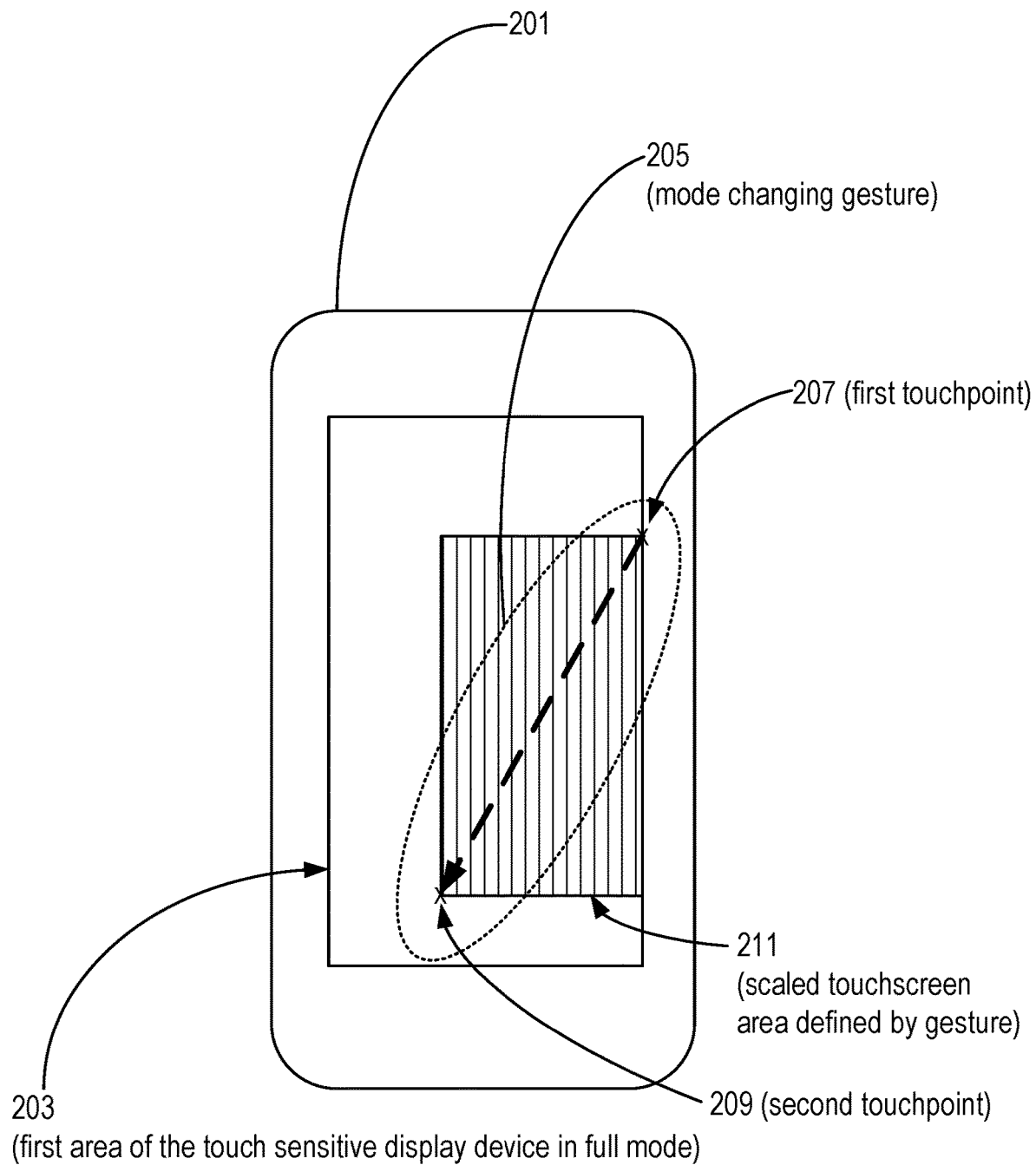
FIG. 2 is a diagram illustrating an alternative mode changing gesture in accordance with an aspect of inventive embodiments.

In some but not necessarily all alternative embodiments, the mode changing gesture 111 takes on a different form. For example, FIG. 2 depicts a device 201 that, when operating in full-size mode, interacts with a user via a first area 203 of the touch sensitive display. In this exemplary embodiment, a mode changing gesture 205 is supplied when a user applies their thumb (or equivalent object) at a first touchpoint 207 and then moves it downward diagonally to a second touchpoint 209. The first and second touchpoints 207, 209 define diagonally opposite corners of a scaled touchscreen area 211, whose placement in some embodiments is also defined by those touchpoints.

Figure 3:
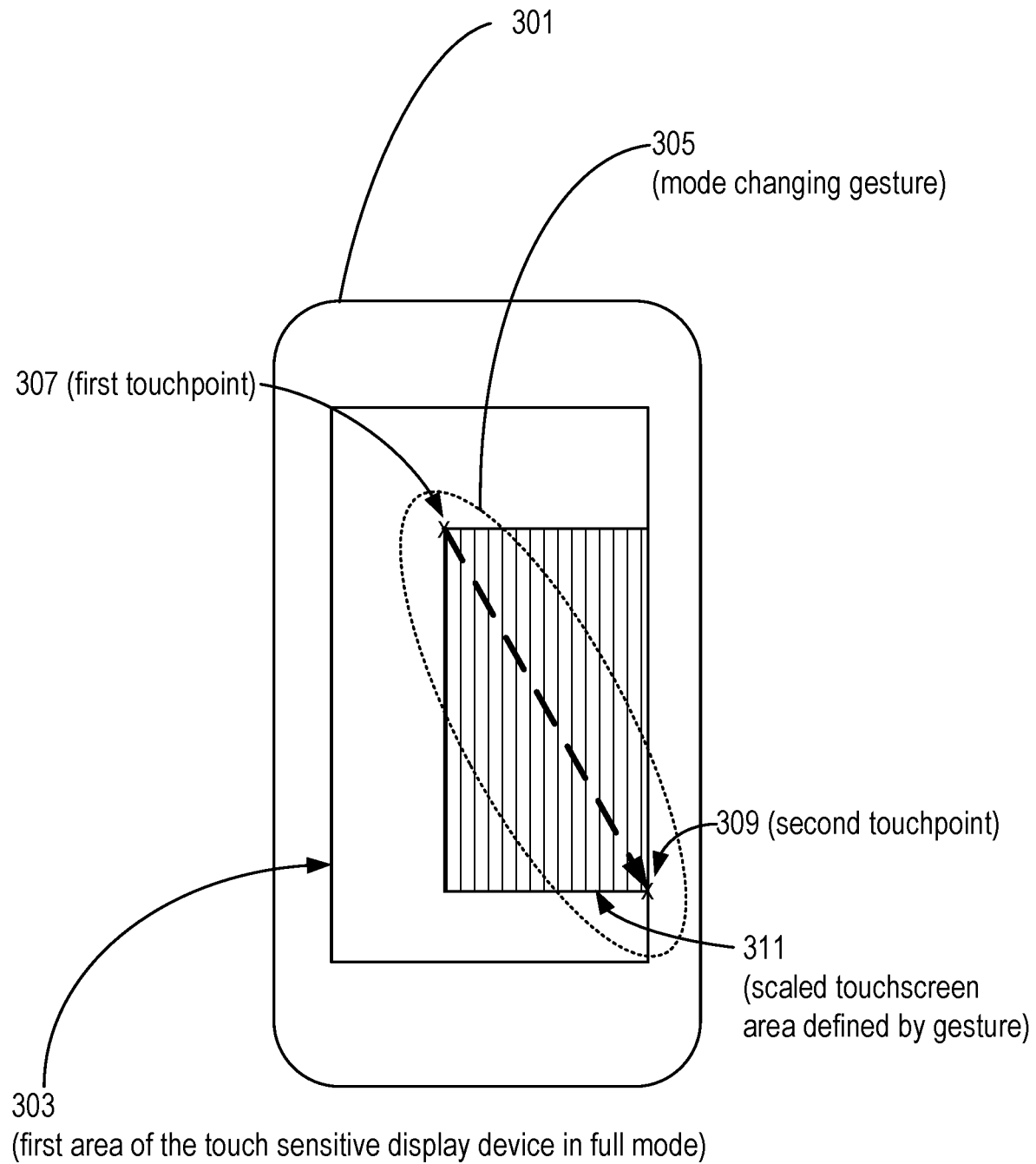
FIG. 3 is a diagram illustrating another alternative mode changing gesture in accordance with an aspect of inventive embodiments.

In some other alternative embodiments, a mode changing gesture 305 is as shown in FIG. 3. Similar as before, a device 301 interacts with a user via a first area 303 of the touch sensitive display when operating in full-size mode. The mode changing gesture 305 also involves a diagonal movement of the user's thumb (or equivalent object), but in this embodiment the movement from the first touchpoint 307 to the second touchpoint 309 is from an upper left corner to a lower right corner of the scaled touchscreen area 311. In some embodiments, placement of the scaled touchscreen area 311 is also defined by the first and second touchpoints 307, 309.

Figure 4:
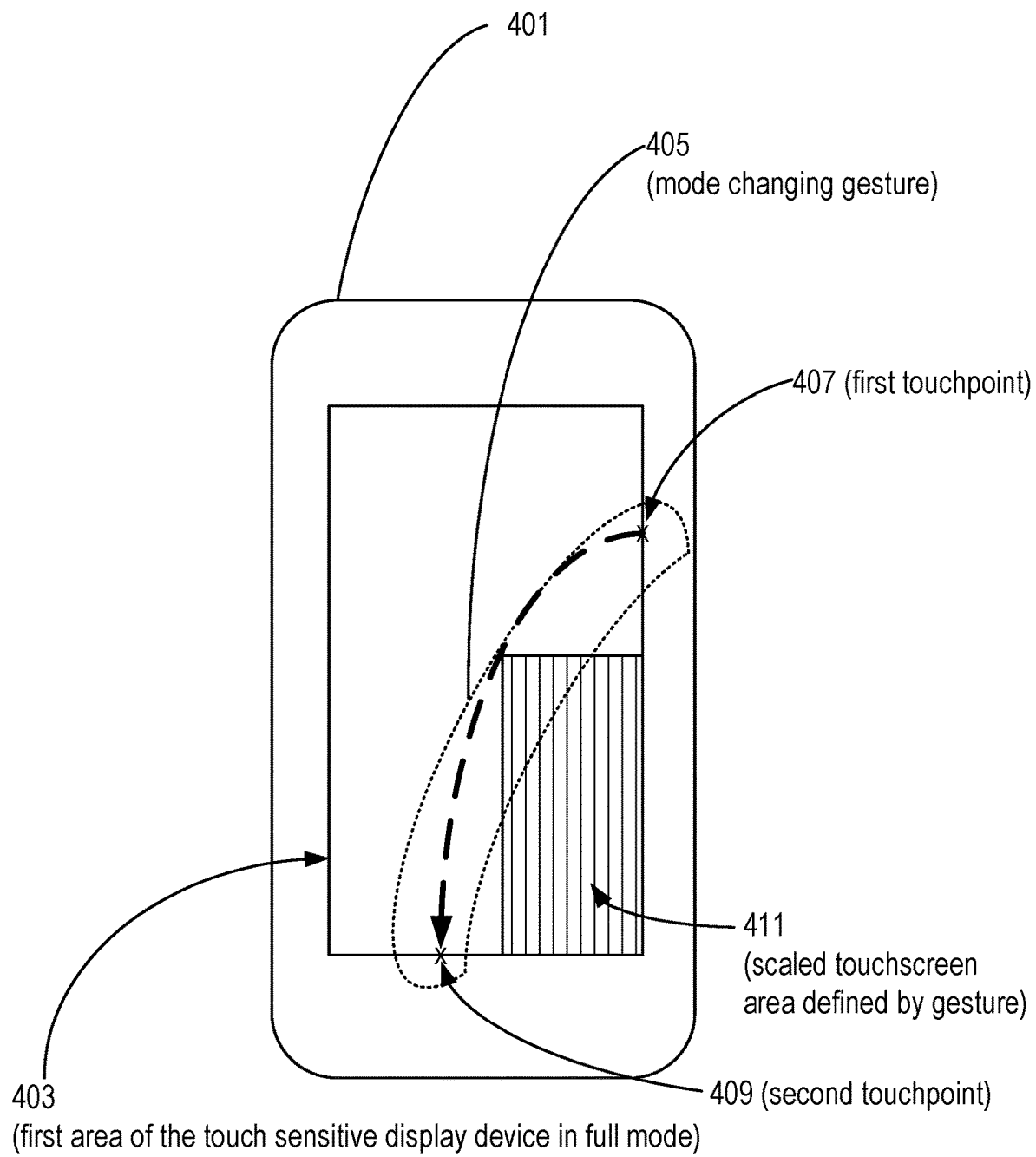
FIG. 4 is a diagram illustrating another alternative mode changing gesture in accordance with an aspect of inventive embodiments.

In yet another class of alternative embodiments, a mode changing gesture 405 is as shown in FIG. 4. Similar as before, a device 401 interacts with a user via a first area 403 of the touch sensitive display when operating in full-size mode. In these embodiments, the mode changing gesture 405 involves the user moving the thumb from a first touchpoint 407 (defining an upper right corner of the gesture 405) in a curved motion according to what is comfortably reached by the thumb until it comes to rest at a second touchpoint 409 (defining a lower left corner of the gesture 405), which can for example be at the bottom of the screen. The scaled down touchscreen area 411 is then defined as the largest rectangle that fits within the area defined by the gesture 405.

In alternative embodiments, the gesture and its interpretation are the same as in FIG. 4, but performed in a mirror-image fashion (i.e., a curved motion from an upper left touchpoint to a lower right touchpoint).

In still other alternatives, any of the above described gestures can be performed in a bottom-to-top motion instead of from top-to-bottom.

In another class of alternatives the mode changing gestures are the same as those described with respect to any of the above-described exemplary embodiments but upon completion of the gesture, the user performs a predefined tap pattern (e.g., two times) at a position that defines a center point of the scaled touchscreen area.

Anyone familiar with handheld user devices will recognize that such devices are typically used when they are in a fully accessible mode, meaning that any of the device's functionality is accessible to the user via the device's one or more user interfaces (e.g., touchscreens, buttons, etc.), and that the devices typically move into limited accessibility mode of operation (usually associated with reduced power usage) in which the display device may be blank and/or the device operating in a locked state in which the touchscreen interface provides only limited accessibility that is used to "open" the device into a fully accessible mode of operation or to a screen in which a device unlocking procedure is taking place (e.g., via entry of a personal identification number, or via analysis of some biometric measurement). Typically, a gesture is predefined (e.g., a swipe up gesture) that indicates a user's desire for the device to transition from a limited accessibility mode of operation (e.g., power saving and/or locked state) to a fully accessible mode of operation (e.g., unlocked). Such predefined gestures conventionally cause the device to enter the fully accessible mode of operation in a full-size mode, requiring the user to perform an additional action to switch it into a suitable mode for one-handed operation.

These problems are addressed in yet another class of alternative embodiments, in which the mode changing gesture can be in accordance with any of the above-described embodiments, but is additionally operational as an initial gesture that both triggers the device transitioning from a limited accessibility mode to a fully accessible mode of operation and also scales the user interface area as defined by the initial gesture (e.g., as described with respect to FIGS. 1A-1F, 2, 3, and 4).

Figure 5:
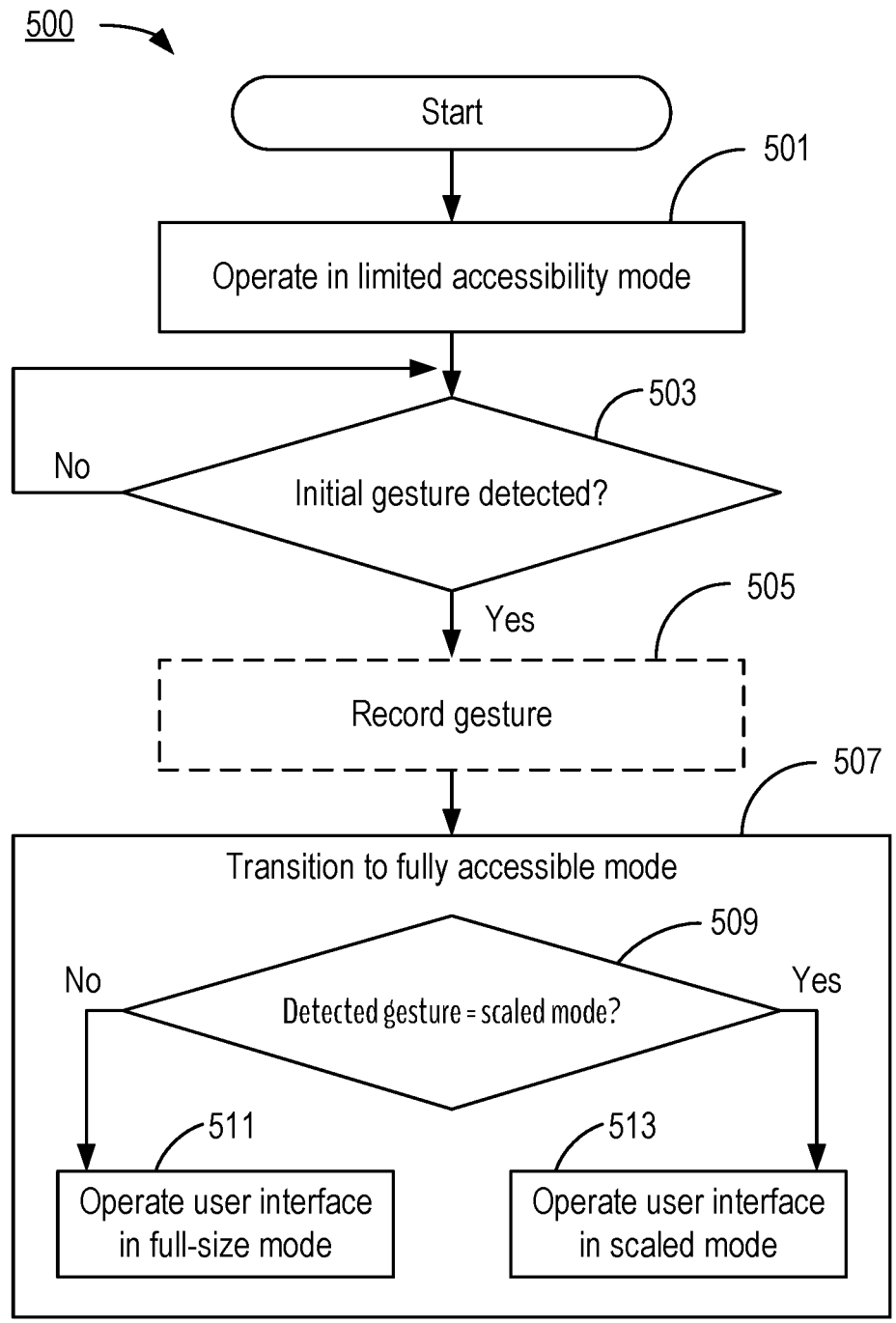
FIG. 5 is, in one respect, a flowchart of actions performed by a device that is configured with one-handed operation in accordance with inventive embodiments.

These embodiments are described in further detail with reference to FIG. 5, which in one respect is a flowchart of actions taken by the device 101, 201, 301, 401 to transition its mode of operation from a limited accessibility mode to a fully accessible mode, and to determine whether the fully accessible mode should be entered with the device operating in full-size mode or in scaled mode. In other respects, the blocks depicted in FIG. 5 can also be considered to represent means 500 (e.g., hardwired or programmable circuitry or other processing means) for carrying out the described actions.

At step 501, a device is operating in a limited accessibility mode (step 501), and remains in this mode so long as no initial gesture is detected ("No" path out of decision block 503). As described earlier, the term "limited accessibility mode" is used herein to refer to a mode of operation in which the device limits the user's ability to access device functionality. Limited accessibility modes are commonly used, for example, when a device is in a low-power mode and/or in a locked state. Conversely, the term "fully accessible mode" is used herein to refer to a mode of operation in which the device permits the user to access at least some of the device functionality that is prevented in the limited accessibility mode.

Upon detecting that an initial gesture has been received by the touch sensitive display device 103 (step 503) (i.e., any one of the gestures defined herein or a gesture previously known for causing a device to initiate transition from a limited accessibility mode to a fully accessible mode), the device performs whatever device-specific procedures are in place for authorizing entry into a fully accessible mode of operation (step 507).

In accordance with an aspect of embodiments consistent with the invention, that transitioning (step 507) includes detecting whether the initial gesture is one of the mode changing gestures (decision block 509). If not ("No" path out of decision block 509), the fully accessible mode is entered with the user interface operating in full-size mode (step 511).

However, if the initial gesture is one of the mode changing gestures ("Yes" path out of decision block 509), the fully accessible mode is entered with the user interface operating in scaled mode (step 513).

In an aspect of some but not necessarily all embodiments consistent with the invention, the transition mode that is configured to transition from the limited accessibility mode to the fully accessible mode of operation itself comprises operating the user interface in the scaled mode if the detected initial gesture is the first mode changing gesture, and otherwise operating the user interface in the full-size mode. In some but not necessarily all alternative embodiments, the transition mode can be configured to permit the user to enter a PIN (i.e., personal identification number; a predefined sequence of numbers) or swipe-pattern on parts of the full display, without requiring that the device's touchscreen be touched where the correct numbers or swipe markers are displayed, but instead touching the touchscreen at locations that correspond to a scaled down version of the correct touch or swipe sequence. The device's system then detects that a scaled down variant of the touch or swipe sequence was correctly entered and then uses that detection to unlock the device and scale down the display appropriately when entering the fully accessible mode.

Detection of whether the initial gesture is one of the mode changing gestures can be performed in any of a number of different ways, all of which are encompassed by inventive embodiments. For example, an analysis of the gesture can be performed dynamically, as the gesture is being entered. Alternatively, the gesture can be recorded (step 505) and analyzed later, as a transition to fully accessible mode is being made.

Figure 6:
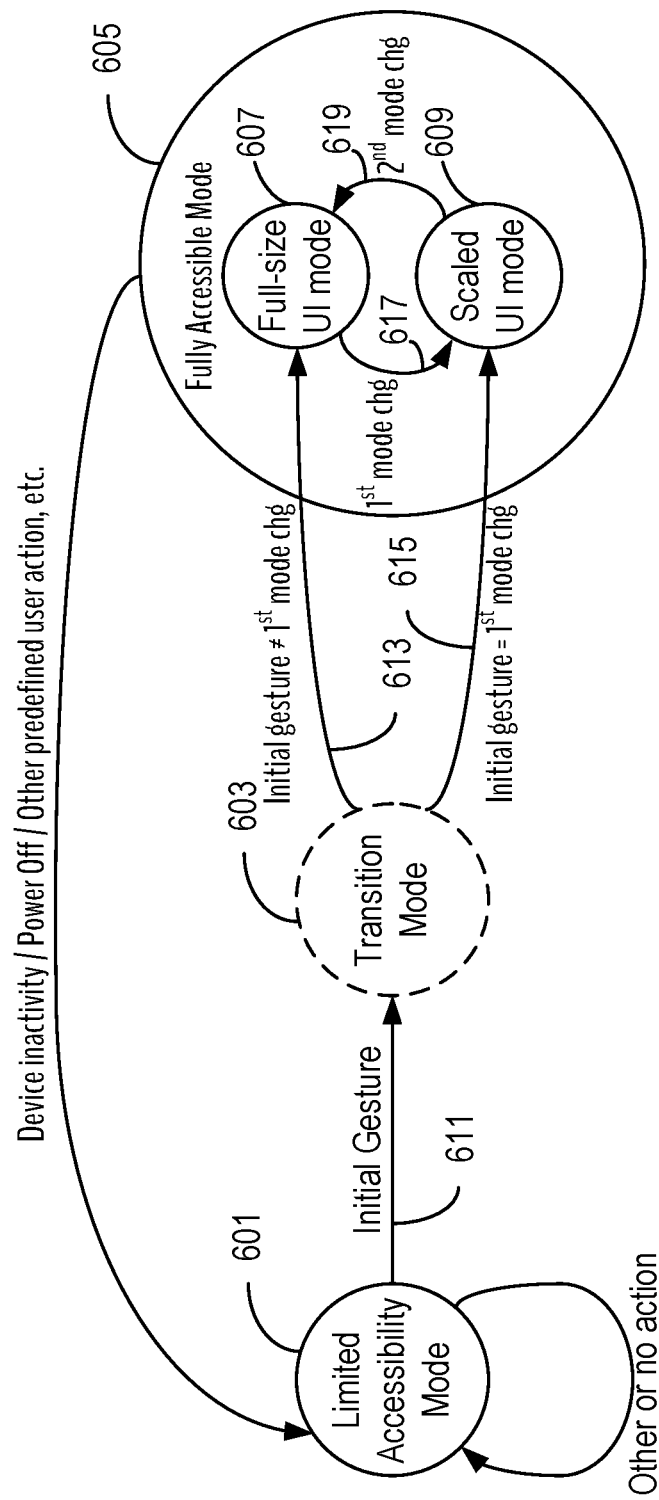
FIG. 6 is a state transition diagram of a device's operation.

To further illustrate aspects of some but not necessarily all embodiments consistent with the invention, FIG. 6 is a state transition diagram of a device's operation. The device has a limited accessibility mode 601 that, as described earlier, is a mode of operation in which the device limits the user's ability to access device functionality. Limited accessibility modes are commonly used, for example, when a device is in a low-power mode and/or in a locked state. When in limited accessibility mode 601, a user will typically see either a blank screen or a lock screen image pictured on the touch sensitive display device 103, although neither of these are essential aspects of inventive embodiments.

The device 101, 201, 301, 401 is configured to transition into a fully accessible mode 605 in response to detection of an initial gesture 611. Otherwise, as shown in the figure, the device 101, 201, 301, 401 remains in the limited accessibility mode 601. The transition from limited accessibility mode to the fully accessible mode 605 can be made directly, and such embodiments are contemplated being within the scope of inventive embodiments. However, device security often requires that the device 101, 201, 301, 401 transition from the limited accessibility mode 601 to an intermediate, transition mode 603 in which the device 101, 201, 301, 401 performs some sort of authorization procedure to ensure that the user is authorized to access the fully accessible mode 605 of the device 101, 201, 301, 401. Such authentication can be based on biometric measurements (e.g., finger scan, visual image analysis, etc.) or by entry of a privately known PIN or other gesture sequence.

Regardless of whether the device 101, 201, 301, 401 transitions directly from the limited accessibility mode 601 to the fully accessible mode 605 or alternatively first passes through the transition mode 603 and then to the fully accessible mode 605, the initial gesture 611 that triggered the transition is analyzed to detect whether it is the same as the mode change gesture or not. If not (613), the device 101, 201, 301, 401 enters the full-size mode 607, which is a mode of operation of the user interface while in the fully accessible mode 605. As described earlier, the term "fully accessible mode" is used herein to refer to a mode of operation in which the device 101, 201, 301, 401 permits the user to access at least some of the device functionality that is prevented in the limited accessibility mode.

But if the initial gesture is recognized as being the mode change gesture (615), then the device 101, 201, 301, 401 enters the scaled mode of operation 609, which is another mode of operation of the user interface while in the fully accessible mode 605.

While in the fully accessible mode of operation 605, device operation will transition from the full-size mode 607 to the scaled mode 609 if it is detected (617) that the user has input the mode changing gesture 111, 205, 305, 405. Similarly, device operation will transition from the scaled mode 609 to the full size mode 607 if it is detected (619) that the user has input the second mode change gesture.

Regardless of whether the device 101, 201, 301, 401 is operating in full-size mode 607 or scaled mode 609, certain events will cause the device 101 to revert to operation in the limited accessibility mode 601. Such events include, but are not limited to, device inactivity for a predefined period of time, detection that the user has pressed a power off button or performed a power off procedure, and the like.

In another aspect of embodiments consistent with the invention, one or more mechanisms are provided for deactivation of one-handed mode (i.e., to transition the device from operation in the scaled down mode 609 to operation in the full-size mode 607). In some embodiments, this transition is triggered by the user inputting a second type of mode change gesture 619, in which two fingers (preferably but not necessarily from different hands) both touch points at or near the middle of the display screen and then move to opposite corners of the screen simultaneously. This type of gesture has an advantage in that it is not likely to be performed by one hand unintentionally, thereby preventing an accidental transition out of scaled down mode into full-size mode.

In an alternative embodiment, the second type of mode change gesture 619 comprises touching the touch sensitive display device 103 with a finger that is typically at the back of the device 101, 201, 301, 401 during one-handed operation (e.g., an index finger). Here too, this type of gesture has an advantage in that it is not likely to be performed by one hand unintentionally, thereby preventing an accidental transition out of scaled down mode into full-size mode.

Figure 7:
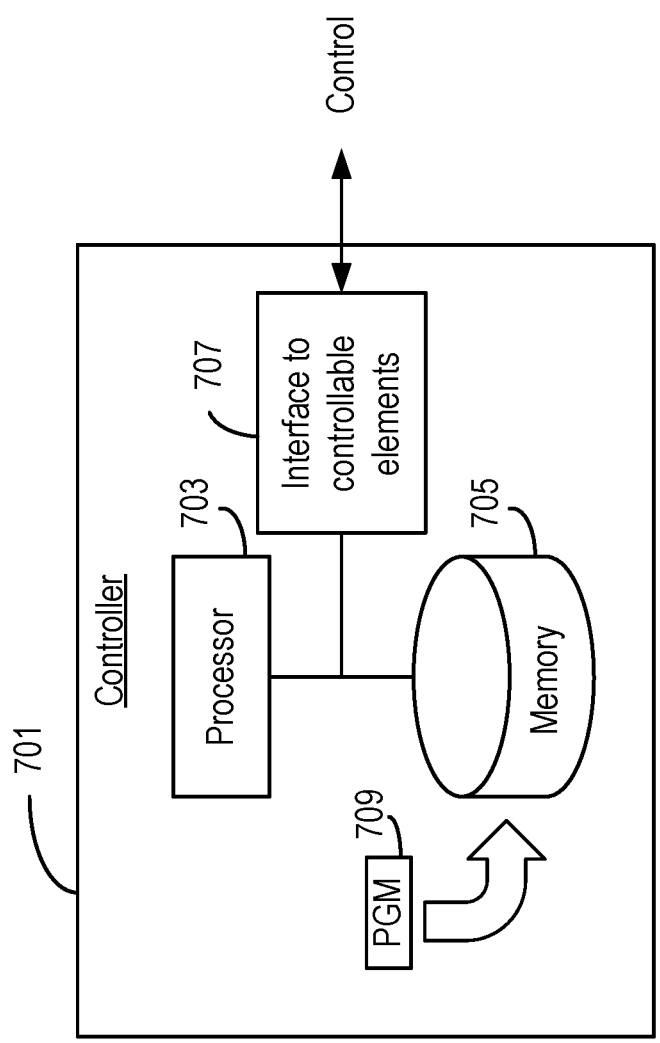
FIG. 7 is a block diagram of an exemplary controller of a device in accordance with some but not necessarily all exemplary embodiments consistent with the invention.

Aspects of an exemplary controller 701 that may be included in the device 101, 201, 301, 401 to cause any and/or all of the above-described actions to be performed as discussed in the various embodiments are shown in FIG. 7, which illustrates an exemplary controller 701 of a device 101, 201, 301, 401 in accordance with some but not necessarily all exemplary embodiments consistent with the invention. In particular, the controller 701 includes circuitry configured to carry out any one or any combination of the various functions described above. Such circuitry could, for example, be entirely hard-wired circuitry (e.g., one or more Application Specific Integrated Circuits—"ASICs"). Depicted in the exemplary embodiment of FIG. 7, however, is programmable circuitry, comprising a processor 703 coupled to one or more memory devices 705 (e.g., Random Access Memory, Magnetic Disc Drives, Optical Disk Drives, Read Only Memory, etc.) and to an interface 707 that enables bidirectional communication with other elements of the device 101, 201, 301, 401. The memory device(s) 705 store program means 709 (e.g., a set of processor instructions) configured to cause the processor 703 to control other system elements so as to carry out any of the aspects described above. The memory device(s) 705 may also store data (not shown) representing various constant and variable parameters as may be needed by the processor 703 and/or as may be generated when carrying out its functions such as those specified by the program means 709.

It will be appreciated that embodiments consistent with the invention allow for a one handed gesture to at the same time initiate one handed mode, define the size of the scaled down display, and define the placement of the scaled down display window on the screen.

Further, by allowing the one handed gesture to also be recognized as an initial gesture that triggers transition of the device from a limited accessibility mode to a fully accessible mode of operation, the user can "open" a handheld device using just one hand, and can immediately continue operating the device with just one hand when it enters the fully accessible mode.

The invention has been described with reference to particular embodiments. However, it will be readily apparent to those skilled in the art that it is possible to embody the invention in specific forms other than those of the embodiment described above. Accordingly, the described embodiments are merely illustrative and should not be considered restrictive in any way. The scope of the invention is further illustrated by the appended claims, rather than only by the preceding description, and all variations and equivalents which fall within the range of the claims are intended to be embraced therein.

The invention claimed is:

1. A method of operating a user interface of a device, wherein the user interface comprises a touch sensitive display device, the method comprising:
   while operating the device in a limited accessibility mode, detecting that an initial gesture has been received by the touch sensitive display device; and
   when entering a fully accessible mode of operation, operating the user interface in a scaled mode if the detected initial gesture is a first mode changing gesture, otherwise operating the user interface in a full-size mode, wherein when an application or system software produces an output image to be displayed on the device:
      operating the user interface in the full-size mode comprises:

displaying the output image over a first area of the touch sensitive display device; and accepting touch input of the application or system software at a set of input touch points lying within the first area of the touch sensitive display device; and operating the user interface in the scaled mode comprises:

scaling the output image and displaying the scaled output image over a scaled area of the touch sensitive display device, wherein the scaled area is smaller than the first area; and scaling the set of input touch points such that the scaled set of input touch points lie within the scaled area of the touch sensitive display device, wherein a size of the scaled area of the touch sensitive display device is related to a first set of one or more detected points within the first mode changing gesture; and a location of the of the touch sensitive display device is related to a second set of one or more detected points within the first mode changing gesture.

2. The method of claim 1, comprising:
recording the detected initial gesture as a recorded gesture; and
evaluating the recorded gesture to decide whether detected initial gesture is the first mode changing gesture.

3. The method of claim 1, comprising:
while operating the device in the fully accessible mode, detecting that the first mode changing gesture has been received by the touch sensitive display device and in response thereto, operating the user interface in the scaled mode.

4. The method of claim 1, comprising:
while operating the device in the fully accessible mode, detecting that a second mode changing gesture has been received by the touch sensitive display device and in response thereto, operating the user interface in the full-size mode.

5. The method of claim 4, wherein the second mode changing gesture comprises received touch point data that represents two fingers concurrently touching respective first and second touchpoints within a central region of the touch sensitive display device and then concurrently moving to opposite sides of the touch sensitive display device.

6. The method of claim 4, wherein the second mode changing gesture comprises received touch point data that represents a touch of the touch sensitive display device by a digit other than a thumb.

7. The method of claim 1, wherein the first mode changing gesture comprises touch sensitive display device input data comprising:
a first touchpoint;
a second touchpoint indicating a first corner of a region of the touch sensitive display device;
a third touchpoint indicating a second corner of the region of the touch sensitive display device; and
a fourth touchpoint indicating a third corner of the region of the touch sensitive display device,
wherein the method further comprises configuring the scaled area of the touch sensitive display device to fit entirely within the region of the touch sensitive display device.

8. The method of claim 7, wherein the second touchpoint is located at a horizontal border of the touch sensitive display device.

9. The method of claim 7, wherein the fourth touchpoint is located at a vertical border of the touch sensitive display device.

10. The method of claim 1, wherein the first mode changing gesture comprises touch sensitive display device input data comprising:
a first touchpoint indicating a first horizontal extent and a first vertical extent of the scaled area of the touch sensitive display device; and
a second touchpoint indicating a second horizontal extent and a second vertical extent of the scaled area of the touch sensitive display device.

11. The method of claim 1, wherein the first mode changing gesture comprises touch sensitive display device input data comprising:
a first touchpoint indicating a first horizontal extent and a first vertical extent of a region of the touch sensitive display device;
a second touchpoint indicating a second horizontal extent and a second vertical extent of the region of the touch sensitive display device; and
a plurality of touchpoints collected between receipt of the first touchpoint and receipt of the second touchpoint; and
wherein the method further comprises configuring the scaled area of the touch sensitive display device to fit entirely within the region of the touch sensitive display device.

12. An apparatus for operating a user interface of a device, wherein the user interface comprises a touch sensitive display device, the apparatus comprising a processor configured to:
detect, while operating the device in a limited accessibility mode, that an initial gesture has been received by the touch sensitive display device; and
when entering a fully accessible mode of operation, operate the user interface in a scaled mode if the detected initial gesture is a first mode changing gesture, otherwise operating the user interface in a full-size mode, wherein when an application or system software produces an output image to be displayed on the device:
operating the user interface in the full-size mode comprises:
displaying the output image over a first area of the touch sensitive display device; and
accepting touch input of the application or system software at a set of input touch points lying within the first area of the touch sensitive display device; and operating the user interface in the scaled mode comprises:
scaling the output image and displaying the scaled output image over a scaled area of the touch sensitive display device, wherein the scaled area is smaller than the first area; and
scaling the set of input touch points such that the scaled set of input touch points lie within the scaled area of the touch sensitive display device,
wherein a size of the scaled area of the touch sensitive display device is related to a first set of one or more detected points within the first mode changing gesture; and
a location of the of the touch sensitive display device is related to a second set of one or more detected points within the first mode changing gesture.

13. The apparatus of claim 12, wherein the processor is further configured to:

record the detected initial gesture as a recorded gesture; and evaluate the recorded gesture to decide whether detected initial gesture is the first mode changing gesture.

14. The apparatus of claim 12, wherein the processor is further configured to:
   detect, while operating the device in the fully accessible mode, that the first mode changing gesture has been received by the touch sensitive display device and in response thereto, operating the user interface in the scaled mode.

15. The apparatus of claim 12, wherein the processor is further configured to:
   detect, while operating the device in the fully accessible mode, that a second mode changing gesture has been received by the touch sensitive display device and in response thereto, operating the user interface in the full-size mode.

16. The apparatus of claim 15, wherein the second mode changing gesture comprises received touch point data that represents two fingers concurrently touching respective first and second touchpoints within a central region of the touch sensitive display device and then concurrently moving to opposite sides of the touch sensitive display device.

17. The apparatus of claim 15, wherein the second mode changing gesture comprises received touch point data that represents a touch of the touch sensitive display device by a digit other than a thumb.

18. The apparatus of claim 12, wherein the first mode changing gesture comprises touch sensitive display device input data comprising:
   a first touchpoint;
   a second touchpoint indicating a first corner of a region of the touch sensitive display device;
   a third touchpoint indicating a second corner of the region of the touch sensitive display device; and
   a fourth touchpoint indicating a third corner of the region of the touch sensitive display device,
   wherein the processor is further configured to configure the scaled area of the touch sensitive display device to fit entirely within the region of the touch sensitive display device.

19. The apparatus of claim 18, wherein the second touchpoint is located at a horizontal border of the touch sensitive display device.

20. The apparatus of claim 18, wherein the fourth touchpoint is located at a vertical border of the touch sensitive display device.

21. The apparatus of claim 12, wherein the first mode changing gesture comprises touch sensitive display device input data comprising:
   a first touchpoint indicating a first horizontal extent and a first vertical extent of the scaled area of the touch sensitive display device; and
   a second touchpoint indicating a second horizontal extent and a second vertical extent of the scaled area of the touch sensitive display device.

22. The apparatus of claim 12, wherein the first mode changing gesture comprises touch sensitive display device input data comprising:
   a first touchpoint indicating a first horizontal extent and a first vertical extent of a region of the touch sensitive display device;
   a second touchpoint indicating a second horizontal extent and a second vertical extent of the region of the touch sensitive display device; and
   a plurality of touchpoints collected between receipt of the first touchpoint and receipt of the second touchpoint; and
   wherein the processor is further configured to configure the scaled area of the touch sensitive display device to fit entirely within the region of the touch sensitive display device.

23. The apparatus of claim 22, wherein a shape defined by the first mode changing gesture is an arc.

24. The apparatus of claim 22, wherein the circuitry configured to configure the scaled area of the touch sensitive display device to fit entirely within the region of the touch sensitive display device comprises:
   circuitry configured to configure the scaled area of the touch sensitive display device to be a largest scaled rectangular area that fits entirely within the region of the touch sensitive display device.

25. The apparatus of claim 12, wherein the first mode changing gesture comprises one or more final taps that indicate where a center point of the scaled area of the touch sensitive display device is to be located.

26. The apparatus of claim 12, wherein the processor is further configured to operate, when operating the device in a transition mode that is configured to transition from the limited accessibility mode to the fully accessible mode of operation, the user interface in the scaled mode if the detected initial gesture is the first mode changing gesture, and otherwise to operate the user interface in the full-size mode.

* * * * *